March 15, 1938. W. NEUMANN 2,110,978
CENTRIFUGAL SEPARATING
Filed March 18, 1935 2 Sheets-Sheet 1

Inventor:
W. Neumann

By John O. Seifat
Attorney

March 15, 1938. W. NEUMANN 2,110,978
CENTRIFUGAL SEPARATING
Filed March 18, 1935 2 Sheets-Sheet 2
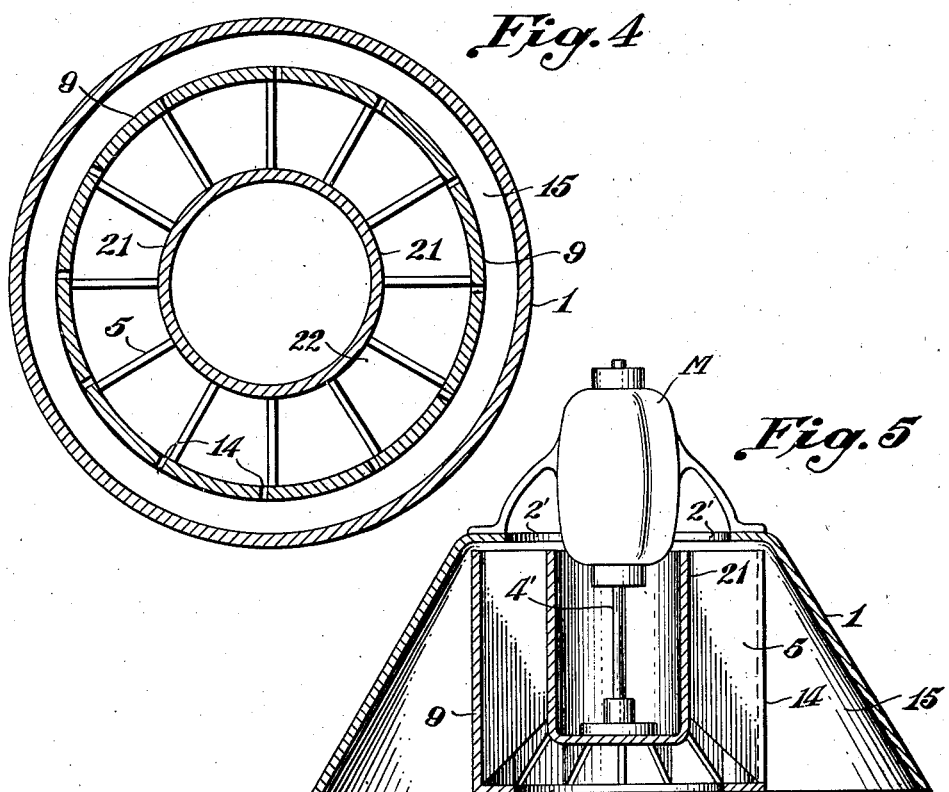
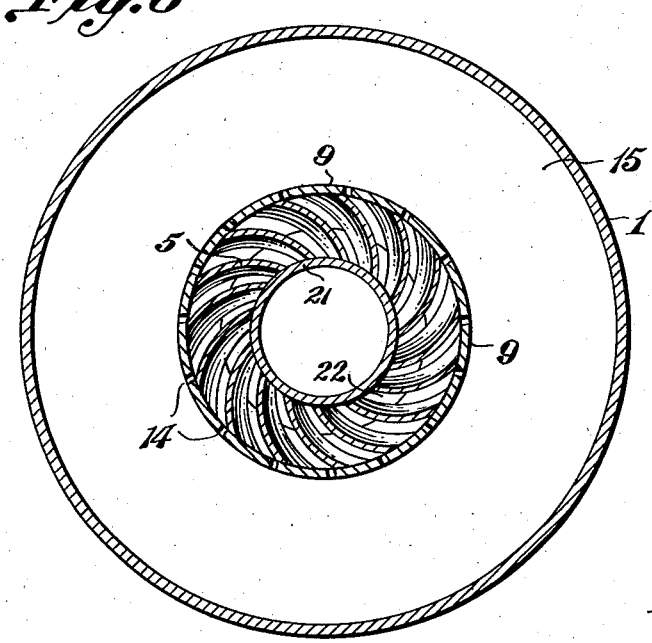
Inventor:
W. Neumann Patented Mar. 15, 1938

2,110,978

UNITED STATES PATENT OFFICE 2,110,978

CENTRIFUGAL SEPARATING

Willy Neumann, Siedlung Ladeburg/Bernau, Germany

Application March 18, 1935, Serial No. 11,724
In Switzerland March 26, 1934

17 Claims. (Cl. 183—77)

This invention relates to the centrifugal separating of impurities, such as dust and other foreign substances, from air and other gases, and it is the object of the invention to provide an improved apparatus for this purpose.

In carrying out the invention of separating impurities, such as dust and other foreign substances, from air and other gases according to the present invention the air or gas with the impurities to be purified is conveyed by a rotor, in which it conforms to the rotary movement thereof, in the direction of the rotor axis, that is, perpendicular to the direction of the centrifugal force. By this means the result is produced that the major portion of the air or gas and a small portion of the air or gas containing the impurities are caused to flow in different directions immediately upon entering the rotor, namely, the impurities by reason of centrifugal action are thrown outwardly, while the air or gas from which the impurities are to be separated flows through the rotor perpendicular to the centrifugal force, with the result that the purified air or gas in leaving the rotor, and in the change in direction of flow resulting in doing so, will not again come in contact with the impurities separated therefrom, nor be set in whirling motion. The particles of dust or other foreign substances thrown outwardly by the centrifugal force are removed from the rotor without, as stated, again coming in contact with the purified gas or air.

In the drawings accompanying and forming a part of this application, Figure 1 is a perspective view, partly in section, of apparatus for carrying out the invention.

Figure 4 is a cross sectional view and Figure 5 is a longitudinal sectional view with a portion of the rotor housing removed of a further modified apparatus for carrying out the invention; and Figure 6 is a view similar to Figure 4 showing a modified arrangement of plates for separating the rotor into longitudinal chambers or passages.

Figure 1:
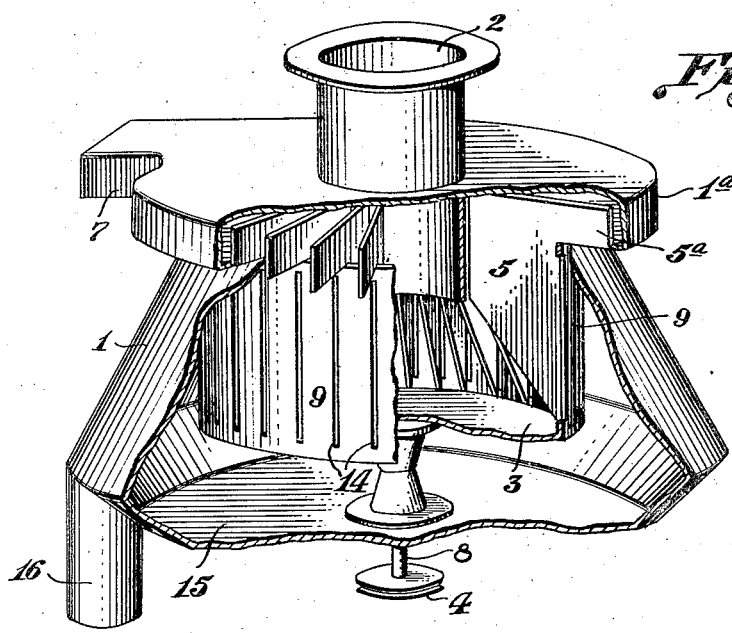

In the preferred embodiment of the invention as shown in Figure 1 there is provided a housing I having a chamber 15 therein, the housing having a side wall portion of truncated conical form, although this wall may extend parallel to the axis of the housing. The housing has an outlet 16 to the atmosphere for the separated impurities leading from an inclined portion of the bottom of the housing. The outlet for the air or gas from which the impurities have been separated is from a portion 7 tangential to an annular enlargement or portion of increased diameter 1ª of the housing above the conical side wall. The inlet to the housing for the impure air or gas is through a pipe or conduit 2 extended into the housing through an axial opening therein.

A rotor 3 in the form of a casing having an open end is rotatably mounted at and with the closed end lowermost on a shaft 8 rotatably mounted in the bottom of the housing, the shaft being operatively connected by suitable means with a source of power, and shown as a pulley 4 fixed on the shaft for a belt drive connection with the source of power. The side wall 9 of the rotor as shown is of cylindrical form, although it may be of conical form, and extends to adjacent the connection of the housing enlargement 1ª and is arranged with slots 14 equidistantly spaced about and extending longitudinally thereof, the slots being of a length slightly less than the side wall of the rotor casing. A series of plates 5 extending longitudinally of the rotor casing are fixed at a longitudinal edge to and extend radially inward from the side wall 9 of the rotor casing and are of a width less than the radius of the rotor casing and of a width so that the inner longitudinal edge is adjacent the conduit 2 and providing the rotor casing with chambers or passages between the plates. The plates 5 are fixed to the side wall of the rotor casing adjacent the slots 14 with the slots arranged forward of the plates in the direction of rotation of the rotor. The lower edge of the plates inclines upwardly from the outer edge of the plates and side wall of the rotor casing toward the inner edge of the plates and axis of the rotor and terminate adjacent the end of the inlet pipe or conduit 2. The plates extend into the housing enlargement 1ª, and each blade is provided with a wing 5ª extending laterally over the edge of the side wall of the rotor casing into the housing enlargement 1ª.

In the method of separating impurities from the air in the operation of said apparatus the air or gas to be purified is admitted into the pipe or conduit 2 and is caused to flow through the rotor chambers and delivered from the rotor by the revolving of the plates 5, 5ª by the rotation of the rotor. The air delivered from the pipe 2 flows to the chambers between the rotor plates and is diverged to flow in an upward direction in said chambers. During the flow of the air through said chambers or passages there is a division of the stream, the impurities in the air, such as dust and other foreign substances, being separated by centrifugal action and caused to be thrown outwardly to the side wall of the rotor casing and delivered through the rotor slots with a small portion or stream of the air into the chamber 15 of the housing and from the latter through the housing outlet 16, the major portion of the stream of the air from which the impurities have been removed or separated being delivered by the plate wings 5ᵃ revolving in the housing enlargement 1ᵃ through the tangential outlet 7 in direction away from the direction of delivery of the impurities separated from the air and without again coming in contact with said separated impurities. Also by the arrangement described the air or gas is not set in whirling motion from the admission of the impure air or gas to the delivery of the purified air or gas with the result that there is no possibility of the separated impurities again mixing with the air or gas from which they were separated.

Figure 2:
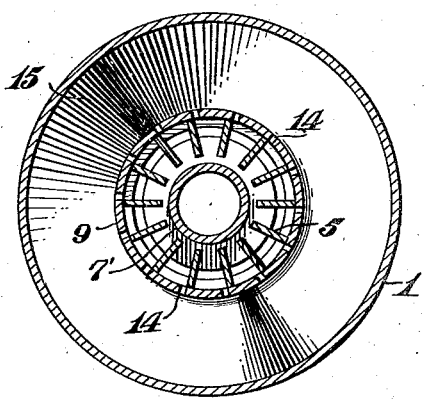
Figure 2 is a longitudinal section of modified apparatus for carrying out the invention with a portion of the rotor housing removed.
Figure 3:
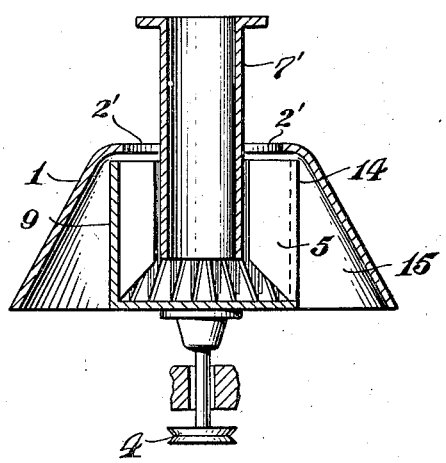
Figure 3 is a cross sectional view of Figure 2.

The structure of the apparatus for carrying out the invention in the embodiment of Figures 2 and 3 is substantially the same as that disclosed in Figure 1, the bottom portion of the housing being removed, and except that the impure air or gas is caused to flow through openings 2' in the housing into the chambers or passages in the rotor casing between the plates 5 at the upper end of the rotor casing and the outlet for the air with the impurities separated therefrom is through the pipe or conduit 7' extended centrally through the housing into the rotor. In the method of separating impurities from air or gas in the operation of the apparatus of Figures 2 and 3 the impure air or gas through the rotation of the rotor is caused to flow through the housing openings 2' directly into and through the chambers between the plates 5, and during the passage of the air or gas through said chambers the impurities are separated from the air by centrifugal action and delivered with a small portion of the air through the rotor slots 14, the major portion of the air from which the impurities have been separated being directed inward toward the axis of the rotor in a direction opposite to the direction of delivery of the separated impurities, and then caused to flow in a direction reversely to the delivery of the impurities separated from the air through the conduit 7' without again coming in contact with the separated impurities.

In the structure of the apparatus of Figures 4 and 5 the housing structure is similar to that of Figures 2 and 3 and has the openings 2' therein. The rotor, however, is provided with an inner wall 21 fixed to the inner edge of the plates 5 and providing chamber 22 between the plates enclosed at all sides. This inner wall is shown as constituting the side wall of an open end casing conforming to the shape of the outer rotor casing with the closed end spaced from the bottom of the outer rotor casing. The outer rotor casing 9 is provided with an opening 9ᵃ axially in the bottom. The rotor is carried by a shaft, shown as the shaft 4' of a motor M carried and supported by brackets upon the housing 1, the shaft extending into and connected to the closed end of the inner member 21 of the rotor casing.

In the method of separating impurities from air or gas in the apparatus of Figures 4 and 5 the impure air or gas may flow through the rotor opening 9ᵃ and by the rotation of the rotor caused to flow longitudinally of the chambers between the plates 5 and during the flow of the air through said chambers the impurities separated therefrom, the major portion of the air with the impurities separated therefrom flowing from the chambers between the plates to the openings 2' in a direction different from the delivery of the impurities separated from the air. Or the impure air may flow to the chambers between the plates 5 from the housing opening 2' and the air with the impurities separated therefrom delivered inwardly from the lower end of said chambers and through the central opening 9ᵃ. The impure air or other gas may be admitted to the upper end of the rotor chambers between the plates or partitions 5 and the impurities separated from the air in its passage through said chambers in a direction parallelly of the axis of the rotor by centrifugal action and delivered through the rotor slots 14, and the air from which the impurities have been separated delivered through the inner wall of the rotor.

In the Figure 6 arrangement the parts are similar to that disclosed in Figures 4 and 5 except that the plates 5 are arranged in spiral form.

The essential feature of the invention is that the stream of air or gas to be purified flows within a rotating system of chambers in the direction of the rotor axis and is set in rotary movement without imparting a whirling action to the air or gas, the dust or other foreign substances in the air or gas being thrown outwardly through the action of centrifugal force and the purified air or gas flowing in a direction away from the delivery of the separated substance and foreign substances separated from the air or gas will not again mix with the air or gas from which they were separated. While the rotor blades or plates are capable of functioning by the rotation of the rotor to effect flow of the air or gas with the impurities into the casing inlet and deliver the air or gas from which the impurities have been separated from the casing outlet, and particularly so when the blades or plates are provided with the wings 5ᵃ as in Figure 1, preferably means are provided to cause the air or gas to flow into the casing and rotor, such as a fan having the outlet connected to the casing inlet to force the air or gas with the impurities into the casing and rotor, or with the inlet connected to the casing outlet for the air or gas from which the impurities have been separated to serve as suction means to draw the air or gas with the impurities into the casing and rotor and deliver the air or gas with the impurities separated therefrom from the casing outlet.

Having thus described my invention, I claim:

1. In centrifugal apparatus for separating impurities from air and other gases, a stationary housing having an impure air inlet and an outlet for impurities separated from the air, a rotor comprising a casing having an open end rotatably mounted in the housing with the open end in communication with the impure air inlet to the housing, slots equidistantly spaced about and extending substantially for the length of the side wall of said casing, and plates extending longitudinally of and radially inward from the side wall of said casing adjacent to and rearwardly of the slots in the direction of rotation of the casing and dividing said casing into longitudinal chambers, said plates being adapted by the rotation of the rotor to cause the air to flow from the impure air inlet to and longitudinally of the rotor chambers and by centrifugal action separate and throw impurities in the air outward through the rotor slots to the casing outlet and direct the separated purified air toward the axis of the cylindrical member, and a tubular outlet member extended through the end of the housing having the impure air inlet centrally into and opening to the rotor casing for delivery of the air directed toward the axis of rotor in a continuous stream in a direction opposite to the flow of impure air through the rotor chambers, and means to rotate the rotor.

2. In centrifugal apparatus for separating impurities from air and other gases, a stationary housing having a chamber therein with an impure air inlet at one end and an outlet for impurities separated from the air at the opposite end, a rotor comprising a casing having an open end rotatably mounted in the housing with the open end in communication with the impure air inlet to the housing and having a series of longitudinal slots in the side wall thereof, and plates extending radially inward from the side wall of and dividing the casing into longitudinal chambers with a slot opening to each chamber adjacent to and forward of the plates in the direction of rotation of the casing, said plates by the rotation of the casing being adapted to cause the air to flow longitudinally through the rotor chambers and during the flow of the air through said chambers through centrifugal action separate impurities from the air and expel the same with portion of the air through the slots into the housing to the housing outlet and direct the separated pure air toward the axis of and axially from the rotor.

3. In apparatus for separating impurities from air and other gases, a fixed housing having a chamber therein arranged with an inlet for the impure air and outlets for impurities separated from the air and the air from which the impurities have been separated, and a rotor rotatable in the housing chamber comprising a casing having an open end with plates spaced about and extending longitudinally and radially inward from the side wall of the casing and arranging the rotor casing with chambers between the plates in communication with the impure air inlet to the housing chamber and having slots in and extending longitudinally of the side wall forward of the plates in the direction of rotation of the rotor, said rotor by the rotation thereof operating to cause the air to flow through the rotor chambers parallelly of the axis of the rotor and by centrifugal action separate impurities from the air in the flow thereof through said chambers and cause the separated impurities to be delivered with a small portion of the air through the rotor slots into the housing and delivery through the housing outlet for the separated impurities and direct the flow of the air from which the impurities have been separated to the purified air outlet from the housing in a direction different from the flow of the separated impurities from the rotor.

4. In centrifugal apparatus for separating impurities from air and other gases, a stationary housing having a chamber therein with an impure air inlet at one end and an outlet for impurities separated from the air at the opposite end, a rotor comprising a casing having an open end mounted in the housing with the open end disposed at the end of the housing with the inlet and having longitudinal slots in the side wall thereof, plates fixed to and projecting radially inward from the side wall of and dividing the rotor casing into longitudinal chambers in communication with the housing inlet, and an outlet member for the purified air extended centrally through the top of the housing into the rotor casing within the rotor plates, the rotor by the rotation thereof being operative to cause the air to flow through the rotor chambers parallelly of the axis of the rotor and by the force of centrifugal action separate impurities from the air in its passage through the rotor chambers and deliver the same with a small portion of the air through the rotor slots and divert the flow of the air from which the impurities have been separated to the outlet member.

5. In centrifugal apparatus for separating impurities from air and other gases, a stationary housing having a chamber therein with an impure air inlet at one end, a rotor comprising a casing having an open end rotatably mounted in the housing with the open end in communication with the housing inlet to receive the impure air therein, said casing having longitudinally slots in the side wall thereof and plates extending radially inward from the side wall and dividing the casing into chambers extending longitudinally of the casing, and a conduit supported by and extended through an opening in the housing axially into and opening to the rotor casing within the plates, said plates being operative by the rotation of the rotor to cause said air to flow through the rotor chambers and during the flow of the air through said chambers separate by centrifugal action impurities from the air and deliver the same with a small portion of the air by centrifugal action through the rotor slots and direct the flow of the purified air in a direction different from the delivery of the separated impurities to a purified air outlet from the housing, and the housing having an outlet opening at the end opposite to the end with the inlet for the impure air for the discharge from the housing of the impurities separated from the air and delivered therein from the rotor slots, and means to drive the rotor.

6. In centrifugal apparatus for separating impurities from air and other gases, a stationary housing having an impure air inlet at one end and an outlet for the discharge of impurities separated from the air at the opposite end a rotor comprising a casing having an open end in communication with the housing inlet, said rotor casing having slots spaced about and extending longitudinally of the side wall and arranged with means operative by the rotation of the rotor to cause the impure air to flow longitudinally through the rotor parallelly of the axis thereof and during such flow of the air separate impurities from the air and cause the same to be delivered with a portion of the air through the slots in the side wall of the rotor casing into the housing and to the housing outlet and direct the air with the impurities separated therefrom toward the axis of the rotor, and an outlet conduit for the purified air delivered from the rotor extended through the housing axially into and opening to the rotor casing.

7. In centrifugal apparatus for separating impurities from air and other gases, a stationary housing having a chamber with an impure air inlet at one end and an outlet for the discharge of impurities separated from the air at the opposite end, a rotor comprising a casing having an annular portion opening to one end of the casing and an outlet axially at the opposite end, said casing being rotatably mounted in the housing with the annular portion in communication with the impure air inlet, plates dividing the annular portion of the casing into longitudinal chambers, and slots in and extending longitudinally of the outer wall of the rotor casing adjacent to and forward of the plates in the direction of rotation of the rotor, said plates by the rotation of the rotor being operative to separate by centrifugal action impurities from the air and cause the same to be delivered with a portion of the air from the air flowing through the chambers through the rotor slots into the housing chamber and housing outlet and direct the air from which the impurities have been separated toward the axis of and from the rotor.

8. In apparatus for separating impurities from air and other gases, a stationary housing having a chamber therein with an inlet for impure air and an outlet for impurities separated from the air, and a rotor comprising a casing having an open end rotatably mounted in the housing chamber, said casing being arranged with a series of circumferentially spaced plates arranging the casing with a series of longitudinal passages extending from the open end of the casing to the closed end of the casing and in communication with the impure air inlet to the housing, and longitudinal slots in the peripheral wall of the rotor casing adjacent to and forward of the plates in the direction of rotation of the rotor, said plates being operative by the rotation of the rotor to cause the impure air to flow longitudinally of the passages in the rotor and during the flow of the air through the passages by the action of centrifugal force separate impurities from the air and deliver the same with a portion of the air laterally through the rotor slots and cause the air from which the impurities have been separated to flow from the rotor passages in a direction away from the delivery of the separated impurities.

9. In apparatus for separating impurities from air and other gases, a stationary housing having a chamber therein with an inlet for impure air and an outlet for impurities separated from the air, a rotor comprising a casing having an open end rotatably mounted in the housing, said casing being arranged with a series of circumferentially spaced plates separating the casing into a series of longitudinally extending passages extending from the open end to the opposite end of the casing and in communication with the impure air inlet to the housing, and longitudinal slots in the peripheral wall of the said casing adjacent to and forward of the plates in the direction of rotation of the rotor, said plates being operative by the rotation of the rotor to cause the air to flow to one end and longitudinally of the rotor passages and during the flow of the air through the passages by the action of centrifugal force separate impurities from the air and deliver the same with a small portion of the air outwardly through the rotor slots and cause the air from which the impurities have been separated to flow from the rotor passages in a direction away from the delivery of the separated impurities.

10. Apparatus for separating impurities from air and other gases as claimed in claim 9, wherein the plates separating the rotor casing into chambers are arranged of spiral form.

11. In apparatus for separating impurities from air and other gases, a stationary housing having a chamber with outlets for the purified air and for the impurities separated from the air, a rotor comprising a casing having an open end mounted in the casing with the open end in communication with the purified air outlet, said casing having slots spaced about and extending longitudinally of the peripheral wall of the casing and plates extended radially inward from the side wall of the rotor casing from adjacent to and rearward of the slots in the direction of rotation of the rotor dividing the rotor casing into longitudinal chambers opening through the open end of the casing and to the closed end of the casing, and a conduit extended through the housing wall axially into the open end of the rotor casing between the plates for the flow of the impure air to the rotor, said rotor being operative by the rotation thereof to divert the flow of said air longitudinally through the rotor chambers parallelly of the axis of the rotor and during said flow of the air separate the impurities therefrom and deliver the same with a portion of the air outwardly through the rotor slots by the action of centrifugal force and delivering the air from which the impurities have been separated to the housing outlet therefor.

12. Apparatus for separating impurities from air and other gases as claimed in claim 11, wherein the outlet for the purified air is from a portion tangential to a portion of the housing of increased diameter, and the rotor plates are extended into the portion of increased diameter and each plate arranged with a laterally extending portion to operate in said portion of increased diameter of the housing.

13. Apparatus for separating impurities from air and other gases as claimed in claim 11, wherein the outlet for the purified air is from a portion tangential to a portion of the housing of increased diameter, and the rotor plates are extended into said portion of increased diameter and each plate provided with a laterally extending portion to operate in said portion of increased diameter of the housing, and an impure air inlet conduit extends into the rotor casing for substantially one-half the length of the plates and the lower edge of the plates incline upwardly from the side wall of the rotor casing and closed end thereof toward the axis of the rotor and terminate adjacent the end of the conduit in the rotor casing.

14. In apparatus for separating impurities from air and other gases, a housing having a chamber with an inlet for the impure air and outlets for impurities separated from the air and the purified air, a rotor rotatable in the housing chamber comprising outer and inner spaced casings having an open end and the outer casing having an opening in the closed end, plates extending between and dividing the space between the side walls of the casings into longitudinal passages in communication at the open end with the impure air inlet in the housing and at the opposite end with the opening in the closed end of the outer casing, and longitudinal slots in the side wall of the outer casing forward of the plates in the direction of rotation of the rotor, the rotor plates being operative by the rotation of the rotor to cause the air to flow longitudinally of the rotor passages and during such flow of the air separate impurities from the air and deliver the same with a portion of the air through centrifugal action outwardly through the rotor slots and cause the purified air to flow from the opening in the closed end of the outer casing.

15. In apparatus for separating impurities from air and other gases as claimed in claim 14, a motor mounted on the housing, and means to operatively connect and support the rotor from the motor shaft.

16. In apparatus for the centrifugal separating of impurities from air and other gases, a rotor comprising a casing open at one end and having slots extending longitudinally of and spaced about the side wall thereof, and plates spaced about and extending longitudinally of and edgewise radially inward from the side wall of the rotor casing, said plates being of a length equal to the length of the casing and of a width less than the radius of the casing with the lower edge inclining upwardly from the outer longitudinal edge of the plates to the inner longitudinal edge of the plates, and one of said plates being arranged adjacent and rearwardly of each slot in the direction of rotation of the rotor and arranging the rotor casing with longitudinal passages.

17. In apparatus for centrifugally separating impurities from air and other gases, a rotor comprising a casing open at one end and arranged with equidistantly spaced plates extending longitudinally of and edgewise radially inward from the side wall thereof, said plates being of a length equal to the length of the casing and of equal width and less than the radius of the casing with the lower edge inclining upwardly from the outer longitudinal edge of the plates and the side wall of the casing to the inner longitudinal edge of the plates and arranging the casing with longitudinal passages, and the side wall of the casing having slots therein adjacent and forwardly of the plates in the direction of rotation of the rotor and being of a length slightly less than the side wall of the casing.

WILLY NEUMANN.